(12) United States Patent
Bushey et al.

(10) Patent No.: US 7,623,632 B2
(45) Date of Patent: Nov. 24, 2009

(54) METHOD, SYSTEM AND SOFTWARE FOR IMPLEMENTING AN AUTOMATED CALL ROUTING APPLICATION IN A SPEECH ENABLED CALL CENTER ENVIRONMENT

(75) Inventors: Robert R. Bushey, Cedar Park, TX (US); Benjamin A. Knott, Round Rock, TX (US); Marc Goldstein, Montreal (CA); Sarah Korth, Chicago, IL (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1239 days.

(21) Appl. No.: 10/926,813

(22) Filed: Aug. 26, 2004

(65) Prior Publication Data

US 2006/0045241 A1 Mar. 2, 2006

(51) Int. Cl.
*H04M 1/64* (2006.01)

(52) U.S. Cl. ............ 379/88.01; 379/88.04; 379/265.01; 379/265.11; 379/265.13

(58) Field of Classification Search ... 379/88.01–88.03, 379/265.01–266.1, 88.04, 114.01, 219, 212.01, 379/245, 248
See application file for complete search history.

(56) References Cited

U.S. PATENT DOCUMENTS

| | | | |
|---|---|---|---|
| 5,027,384 A | 6/1991 | Morganstein | 379/67 |
| 5,675,707 A | 10/1997 | Gorin et al. | 395/2.66 |
| 5,796,394 A | 8/1998 | Wicks et al. | 345/329 |
| 5,850,433 A | 12/1998 | Rondeau | 379/201 |
| 6,081,774 A | 6/2000 | de Hita et al. | 704/9 |
| 6,091,805 A | 7/2000 | Watson | 379/93.17 |
| 6,094,635 A | 7/2000 | Scholz et al. | 704/270 |
| 6,154,527 A | 11/2000 | Porter et al. | 379/88.18 |
| 6,167,370 A | 12/2000 | Tsourlkov et al. | 704/9 |
| 6,269,153 B1 | 7/2001 | Carpenter et al. | 379/88.02 |
| 6,314,402 B1 | 11/2001 | Monaco et al. | 704/275 |
| 6,327,566 B1 | 12/2001 | Vanbuskirk et al. | 704/257 |
| 6,411,686 B1 | 6/2002 | Porter et al. | 379/88.18 |
| 6,539,078 B1 | 3/2003 | Hunt et al. | 379/88.04 |
| 6,560,329 B1 | 5/2003 | Draginich et al. | 379/265.02 |
| 2001/0014852 A1 | 8/2001 | Tsourlkov et al. | 704/9 |
| 2001/0039490 A1 | 11/2001 | Verbitsky et al. | 704/9 |
| 2001/0049688 A1 | 12/2001 | Fratkina et al. | 707/104.1 |
| 2002/0007267 A1 | 1/2002 | Batchilo et al. | 704/9 |
| 2002/0010574 A1 | 1/2002 | Tsourikov et al. | 704/9 |
| 2002/0022955 A1 | 2/2002 | Troyanova et al. | 704/9 |
| 2002/0087328 A1 | 7/2002 | Deneberg et al. | 704/275 |
| 2002/0087497 A1 | 7/2002 | Trolanova et al. | 706/45 |
| 2002/0091530 A1 | 7/2002 | Panttaja | 704/275 |
| 2002/0184002 A1 | 12/2002 | Galli | 704/7 |
| 2002/0193994 A1 | 12/2002 | Kibre et al. | 704/260 |

(Continued)

OTHER PUBLICATIONS

International Search Report and Written Opinion; PCT/US05/29545; pp. 7, Mailing Date Feb. 8, 2006.

*Primary Examiner*—MD S Elahee
(74) *Attorney, Agent, or Firm*—Jackson Walker L.L.P.

(57) ABSTRACT

A system, method and software for implementing an automated call routing application in a speech enabled call center environment are provided. In operation, the invention provides for the identification of a call center transaction selection from a natural language user utterance and the invocation of one or more scripts operable to route the user to a call center service agent configured to service the selected transaction. In the event a transaction selection cannot be readily identified or can only be partially identified, the invention provides for the initiation of a dialog module or script directed to eliciting a discernable transaction selection and/or the presentation of one or more menus from which the user may select an available call center transaction.

12 Claims, 7 Drawing Sheets

U.S. PATENT DOCUMENTS

| | | | |
|---|---|---|---|
| 2003/0026409 A1 | 2/2003 | Bushey et al. | 379/211.02 |
| 2003/0043976 A1 | 3/2003 | Arunachalam | 379/88.16 |
| 2003/0061039 A1 | 3/2003 | Levin | 704/246 |
| 2003/0143981 A1 | 7/2003 | Kortum et al. | 455/414 |
| 2003/0212558 A1 | 11/2003 | Matula | 704/260 |
| 2004/0032941 A1 | 2/2004 | Graham et al. | 379/219 |
| 2005/0074101 A1* | 4/2005 | Moore et al. | 379/114.01 |

* cited by examiner

METHOD, SYSTEM AND SOFTWARE FOR IMPLEMENTING AN AUTOMATED CALL ROUTING APPLICATION IN A SPEECH ENABLED CALL CENTER ENVIRONMENT

TECHNICAL FIELD OF THE INVENTION

The present invention relates generally to speech recognition and, more particularly, to speech recognition enabled automatic call routing service systems.

BACKGROUND OF THE INVENTION

Developments in speech recognition technologies support more natural language interaction between services systems and customers than that previously supported. One of the most promising applications of these new technologies is Automatic Call Routing (ACR). The goal of an ACR application is to determine why a customer is calling the service center and to route the customer to the most appropriate agent for servicing a customer request. Speech recognition technology generally allows an ACR application to recognize natural language statements so the application does not have to rely on a menu system. This allows the customer to state the purpose of their call "in their own words". In order for an ACR application to properly route calls, the ACR must generally interpret the intent of the customer, identify the type or category of customer call, and then identify the correct routing destination for the call type.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Preferred embodiments and their advantages are best understood by reference to FIGS. 1 through 8, wherein like numbers are used to indicate like and corresponding parts.

Figure 1:
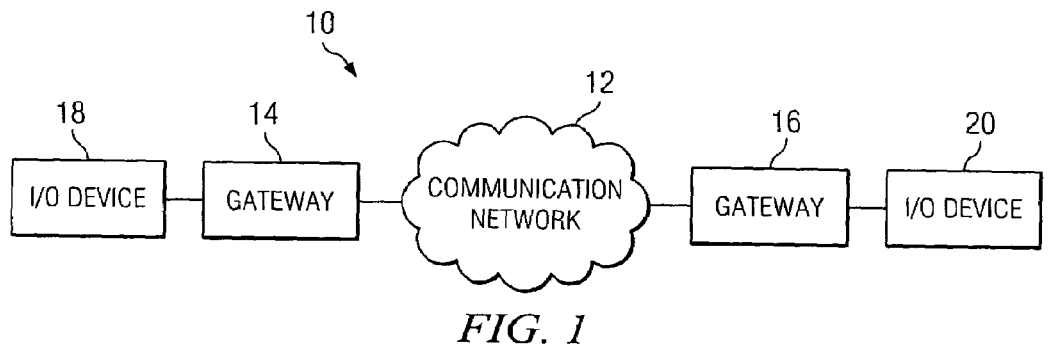
FIG. 1 is a schematic diagram depicting one embodiment of a telecommunications system incorporating teachings of the present invention.

Referring first to FIG. 1, a schematic diagram of an exemplary embodiment of a telecommunications system, indicated generally at 10 is shown. Telecommunication system 10 may include communication network 12 in communication with one or more gateway devices 14 and 16. Input/output (I/O) devices 18 and 20 are each preferably in communication with respective gateway devices 14 and 16. Accordingly, I/O devices 18 and 20 may be in selective communication with each other via gateway devices 14 and 16, and communication network 12.

In one embodiment, communication network 12 may be a public switched telephone network (PSTN). In alternate embodiments, communication network 12 may include a cable telephony network, an IP (Internet Protocol) telephony network, a wireless network, a hybrid Cable/PSTN network, a hybrid IP/PSTN network, a hybrid wireless/PSTN network or any other suitable communication network or combination of communication networks.

Gateways 14 and 16 preferably provide I/O devices 18 and 20 with an entrance to communication network 12 and may include software and hardware components to manage traffic entering and exiting communication network 12 and conversion between the communication protocols used by I/O devices 18 and 20 and communication network 12. In some embodiments, gateways 14 and 16 may function as a proxy server and a firewall server for I/O devices 18 and 20. In some embodiments, gateways 14 and 16 may be associated with a router (not expressly shown), operable to direct a given packet of data that arrives at gateway 14 or 16, and a switch (not expressly shown), operable to provide a communication path in and out of gateway 14 or 16.

In the present embodiment, I/O devices 18 and 20 may include a variety of forms of equipment connected to communication network 12 and accessible to a user. I/O devices 18 and 20 may be telephones (wireline or wireless), dial-up modems, cable modems, DSL (digital subscriber line) modems, phone sets, fax equipment, answering machines, set-top boxes, televisions, POS (point-of-sale) equipment, PBX (private branch exchange) systems, personal computers, laptop computers, personal digital assistants (PDAs), SDRs, other nascent technologies, or any other appropriate type or combination of communication equipment available to a user. I/O devices 18 and 20 may be equipped for connectivity to communication network 12 via a PSTN, DSLs, a cable network, a wireless network, or any other appropriate communications channel.

Figure 2:
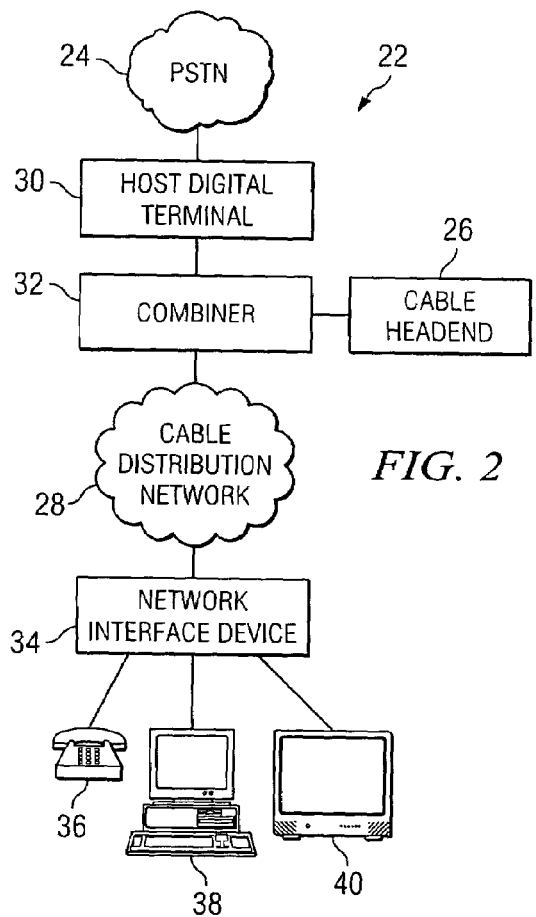
FIG. 2 is a schematic diagram depicting an alternate embodiment of a telecommunications system incorporating teachings of the present invention.

Referring now to FIG. 2, a block diagram of an exemplary embodiment of a telecommunication system 22 is shown. In the exemplary embodiment shown, system 22 preferably includes a PSTN 24 and cable head-end 26 in communication with cable distribution network 28. PSTN 24 may be in operable communication with host digital terminal (HDT) 30 and function to convert signals received from PSTN 24 for transmission over cable networks. Host digital terminal 30 and cable head-end 26 may be in communication with combiner 32. Combiner 32 may communicate data received from cable head-end 26 and/or PSTN 24 to cable distribution network 28. Cable distribution network 28 may further communicate data to network interface device 34 to a user via telephone 36, computer 38, television 40 or any other suitable I/O device. Cable head-end 26 may provide cable television programming and cable modem communications. Cable head-end 26 typically includes a cable modem termination system (not expressly shown) for sending and receiving digital cable modem signals.

Figure 3:
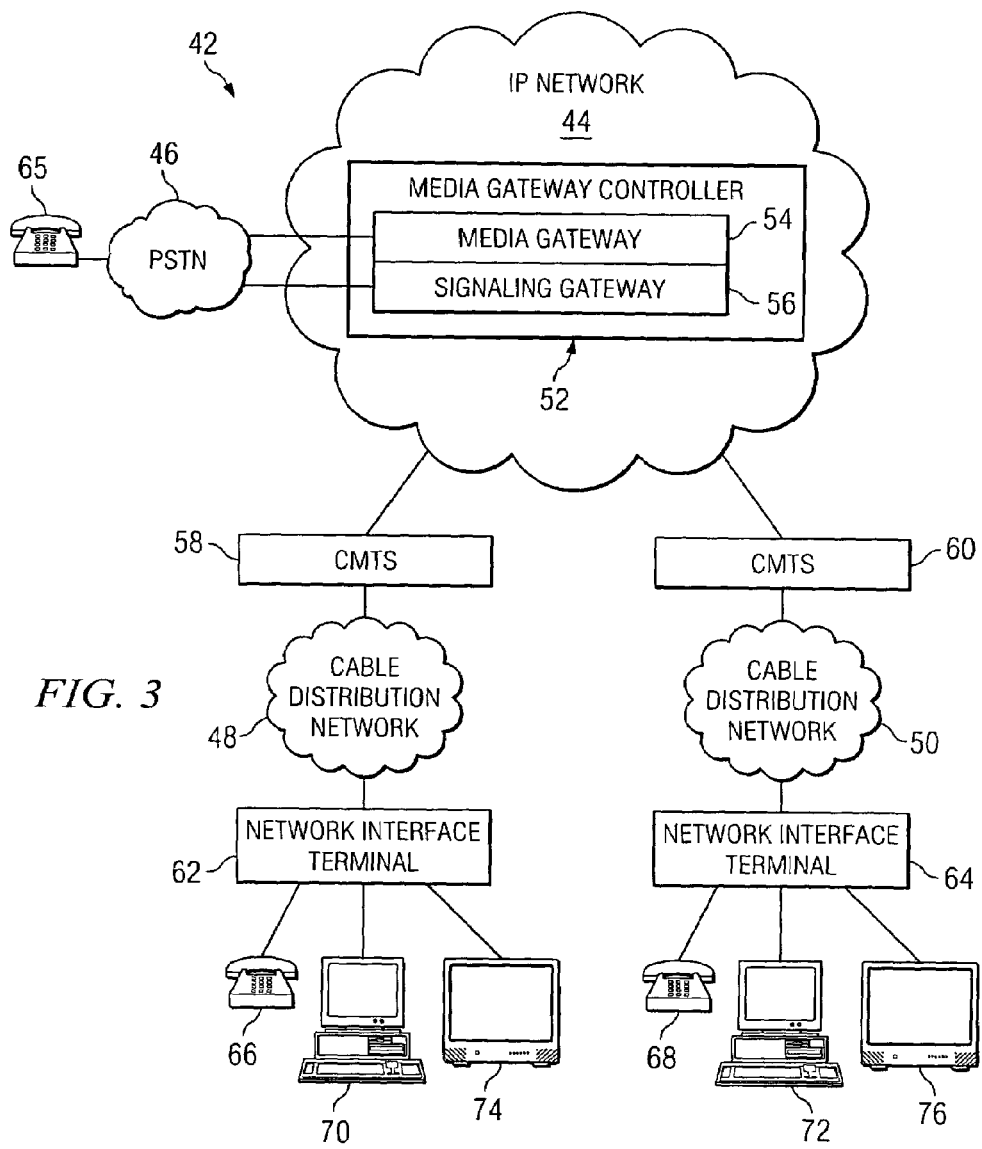
FIG. 3 is a schematic diagram depicting a further embodiment of a telecommunications system incorporating teachings of the present invention.

Referring next to FIG. 3, a block diagram of an exemplary embodiment of a telecommunication system 42 is shown. This exemplary embodiment generally includes interconnected IP network 44, PSTN 46, and cable distribution networks 48 and 50. IP network 44 may include media gateway controller 52, media gateway 54, and signaling gateway 56. Media gateway 54 and signaling gateway 56 may be in operative communication with PSTN 46 and facilitate communication of information therebetween. IP network 44 may further communicate with cable distribution networks 48 and 50 via cable modem termination systems (CMTS) 58 and 60, respectively. CMTS 58 and 60 may convert IP packets received from IP Network 44 for transmission on cable distribution networks 48 and 50 and convert signals received from cable distribution networks 48 and 50 into IP Packets for transmission to IP Network 44. Cable distribution networks 48 and 50 may communicate information with users via network interface terminals 62 and 64. Network interface terminals 62 and 64 may provide data services to users through I/O devices such as, telephones 66 and 68, computers 70 and 72, and televisions 74 and 76. One or more data services may also be provided to a user through PSTN 46 and one or more I/O devices such as telephone 65.

Telecommunication system 42 of FIG. 3 preferably allows transmission of services to be delivered to users where such services include, without limitation, voice over Internet protocol ("VoIP"), video over Internet, video-on-demand over broadband connections, and the ability to view television and film images as well as broadcasts. In addition, one of ordinary skill will appreciate that other embodiments can be deployed with many variations in the number and type of I/O devices, communication networks, the communication protocols, system topologies, and myriad other details without departing from the spirit and scope of the present invention.

Figure 4:
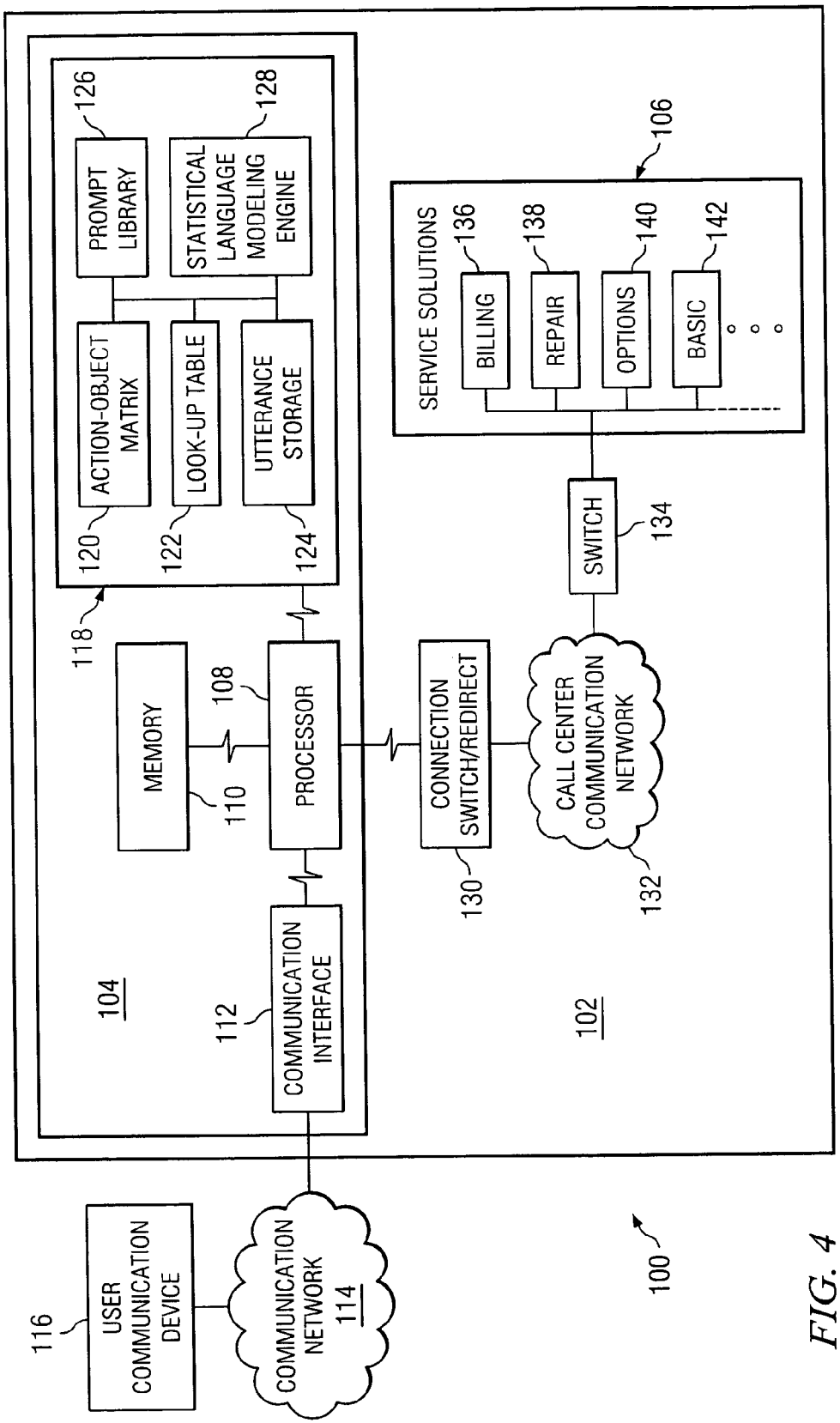
FIG. 4 is a block diagram depicting one embodiment of a speech enabled automated call routing call center incorporating teachings of the present invention.

Referring now to FIG. 4, a block diagram illustrating one embodiment of a call center incorporating teachings of the present invention is shown. While reference herein is made primarily to a customer service call center, alternate implementations of teachings of the present invention may be employed without departing from the spirit and scope thereof.

Illustrated generally at 100 is one embodiment of a system operable to permit a user to perform one or more transactions via a plurality of service agents available from a service center. As illustrated in FIG. 4, system 100 preferably includes call center 102. Call center 102 may include one or more computing apparatuses 104 operably coupled to one or more transaction processing service solutions or agents 106.

Preferably included in communication apparatus 104 is processor 108. Operably coupled to processor 108 of computing apparatus 104 is memory 110. Computing apparatus 104 preferably employs processor 108 and memory 110 to execute and store, respectively, one or more instructions of a program of instructions.

Also preferably included in computing apparatus 104, as illustrated in FIG. 4, is communication interface 112. Communication interface 112 is preferably operable to couple computing apparatus 104 and/or service or call center 102 to an external communication network 114. According to teachings of the present disclosure, communication network 114 may be implemented as a PSTN, a cable telephony network, an IP telephony network, a wireless network, a hybrid cable/PSTN network, a hybrid IP/PSTN network, a hybrid wireless/PSTN network, or any other suitable communication network or combination of communication networks.

Communication interface 112 preferably cooperates with communication network 114 and user communication device 116 to permit a user or customer to perform one or more transactions using transaction processing scripts or agents 106 preferably included in call center 102. As described above, user communication device 116 may be a wireless or wireline telephone, dial-up modem, cable modem, DSL modem, or any other appropriate type or combination of communication equipment available to a user.

In operation, call center 102 preferably permits a user, in their natural language, to request processing or performance of one or more transactions available from service solution scripts or agents 106. To enable such transaction processing, computing apparatus 104 may include or have access to one or more storage devices 118 including one or more programs of instructions substantially operable to interpret the intent of a user, identify a solution sought by the user and route the user to an appropriate service solution script or agent.

To aid in the interpretation, identification and routing operations of call center 102, storage 118 preferably includes action-object matrix 120, look-up table 122, utterance storage 124, prompt library 126, as well as one or more speech recognition capabilities, such as statistical language modeling engine 128. Additional detail regarding the operation and cooperation of the various components preferably included in storage 118 is discussed below.

In one embodiment of the present invention, computing apparatus 104 is preferably communicatively coupled to one or more connection switches or redirect devices 130. Connection switch or redirect device 130 preferably enables computing apparatus 104, upon determining an appropriate routing destination for the processing of a selected transaction, to route the user via communication network 132 and, optionally, one or more switches 134, to an appropriate script, agent or module of transaction processing service solution 106.

Transaction processing service solution scripts or agents 106 preferably includes a plurality of agents or modules operable to perform one or more operations in association with the processing of a selected transaction. For example, transaction processing service solution 106 may include one or more scripts, agents or modules operable to perform billing service solutions 136, repair service solutions 138, option service solutions 140, basic service solutions 142, as well as other service solutions. In addition, the scripts, agents or modules implemented in or in association with transaction processing service solution 106 may include, but are not limited to, automated or self-service data processing apparatuses, live technician support (human support), as well as combinations thereof.

Figure 5:
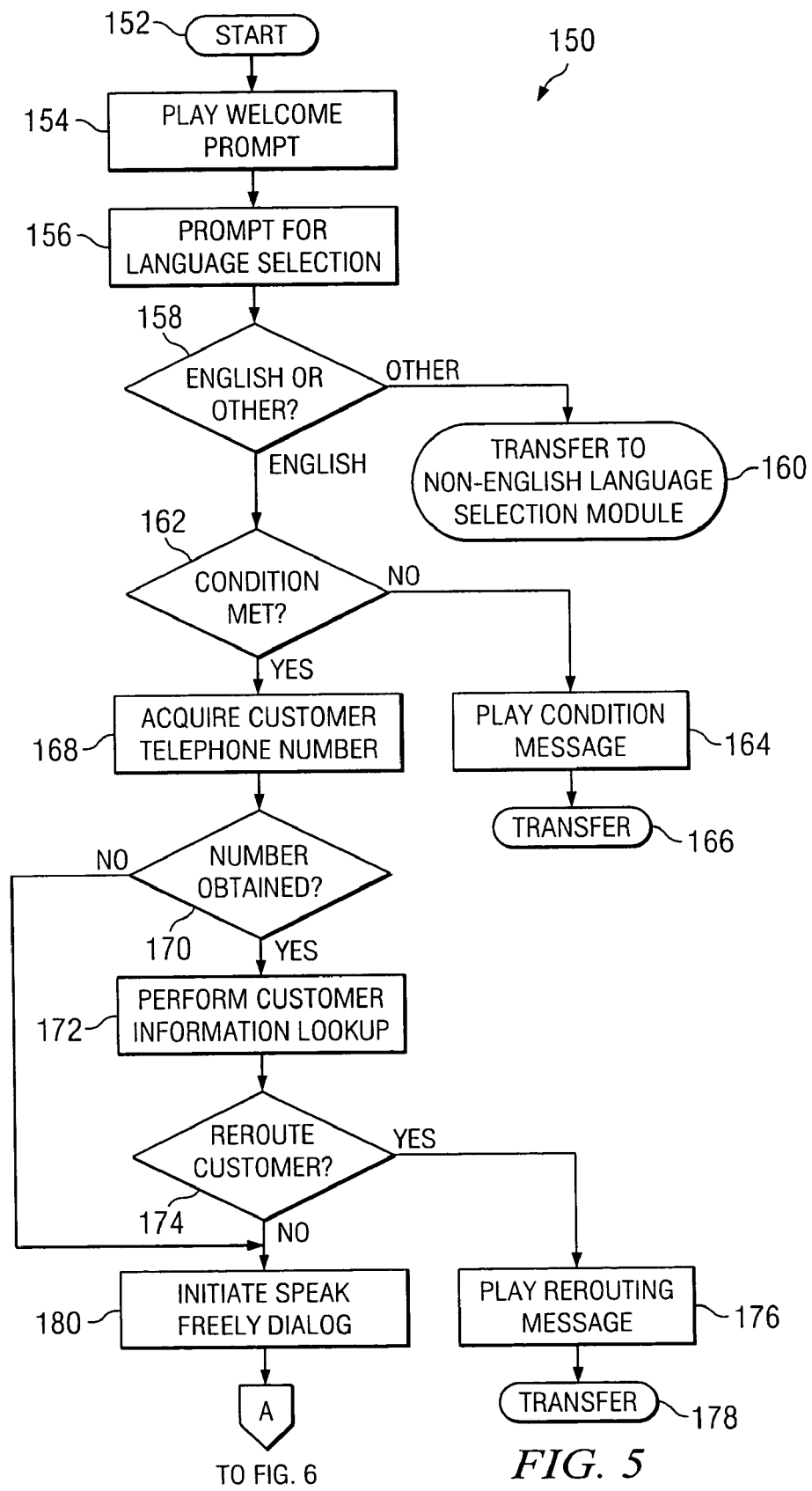
FIG. 5 is a flow diagram depicting one embodiment of a portion of a method for implementing an automated call routing application in a speech enabled call center environment incorporating teachings of the present invention.

Referring now to FIG. 5, a flow diagram depicting one embodiment of a portion of a method for implementing an automated call routing (ACR) application in a speech enabled call center environment is shown according to teachings of the present invention. In one embodiment, method 150 of FIG. 5 may be used in conjunction with one or more components of the ACR application system depicted generally at 100 in FIG. 4.

After beginning at 152, method 150 preferably proceeds to 154 where a system greeting or welcome prompt may be communicated to a user. For example, a user contacting call center 102 via user communication device 116 over communication network 114 may be presented with one or more system greetings or welcome prompts preferably notifying the user of contact with a specific area of call center 102 and potentially with other information. In one embodiment, computing apparatus 104 may select the prompt to be communicated to the user from prompt library 126. In alternate embodiments, the prompt communicated to the user may be predetermined or generated in response to one or more circumstances associated with a user communication connection.

Following communication of a welcome prompt or greeting at 154, method 150 preferably proceeds to 156. At 156, the user may be presented with a language selection prompt. For example, call center 102 may be implemented in a region where the population which is served by the call center speaks a variety of languages, such as English, Spanish, Chinese, Japanese, German, etc.

After prompting the user for selection of a language with which the user prefers to proceed through a call center transaction at 156, method 150 preferably proceeds to 158 where a response may be awaited and a determination as to the language selection of the user may be made. If at 158 it is determined that the user prefers a language other than a call center 102 default language, e.g., English, method 150 preferably proceeds to 160 where the user may be transferred to an alternate language selection module or secondary language call center 102 implementation. Alternatively, if at 158 it is determined that the user prefers to proceed through one or more available call center transactions using a call center 102 default language selection, method 150 preferably proceeds to 162. In one embodiment of the present invention, following transfer of a user to a language selection model or a secondary language call center 102 implementation, such as at 160 of method 150, the user electing to proceed in a non-default language may proceed through such operations in a manner as generally discussed herein but using their language selection preference.

At 162 of method 150, one or more default conditions of call center 102 may be evaluated against selected circumstances to determine whether a default condition is met or presently exists. For example, call center 102 may be configured to operate during certain hours of each day and on certain days of the week. If a user contact is received during those hours which call center 102 is scheduled to be unavailable, method 150 may proceed from 162 to 164 where a condition message indicating the call center's business hours may be communicated to the user. Following communication of a condition message, method 150 may proceed to 166 where the user may be transferred to an alternate module such as a messaging module or system where the user may leave a message for return service via a live agent or automated system available from call center 102. Alternatively, or in addition to providing a messaging service, the communication connection between the current user and call center 102 may be severed following communication of a condition message. Alternative embodiments of conditions which may suggest or require a user be transferred and/or disconnected are contemplated within the spirit and scope of the teachings of the present disclosure.

If at 162 it is determined that one or more default call center conditions are not met, method 150 preferably proceeds to 168. At 168, an account or customer telephone number is sought and obtained. In one embodiment, the customer telephone number preferably sought and obtained at 168 may be the telephone number from which the user is presently contacting call center 102. In an alternate embodiment, the account or customer telephone number preferably sought and obtained at 168 may be the telephone number which has prompted the current user call center 102 contact. In one embodiment, the customer telephone number preferably sought and obtained at 168 may be acquired verbally, via DTMF input, by extracting the customer telephone number from the current user-to-call center communication connection, such as via one or more caller ID services, as well as by other means.

At 170 of method 150, a determination may be made as to whether an account or customer telephone number has been obtained. If an account or customer telephone number has been obtained, method 150 preferably proceeds to 172. At 172, one or more aspects of customer account information may be reviewed based on the provided account or customer telephone number. For example, information reviewed at 172 and associated with the obtained account or customer telephone number may include, but is not limited to, a customer type, such as whether the customer is a preferred customer, a business customer, or an individual customer, an account status, the level of service to be provided to the contacting customer, as well as other available information.

At 174, results of the customer information review preferably performed at 172 may be evaluated for a determination as to whether the present customer should be rerouted according to one or more conditions. For example, if it is determined at 174 that the present customer is delinquent on one or more accounts, method 150 may proceed to 176 where a rerouting message may be communicated to the user at 178 before transferring the user to an appropriate service agent or live support available from call center 102. If at 174 it is determined that the present customer is not to be rerouted, method 150 preferably proceeds to 180. Method 150 may also proceed to 180 from 170 in the event an account or customer telephone number has not or cannot be obtained or acquired, e.g., the current user seeks to establish a new account or service.

At 180, a speak freely dialogue module is preferably initiated. According to teachings of the present invention, a speak freely dialogue module preferably enables a user to request information or assistance in the performance of one or more transactions available from call center 102 using natural language utterances. Additional detail regarding a speak freely dialogue module concept and/or user requests for information or the performance of one or more transactions via natural language utterances is discussed below. Following the initiation of the speak freely dialogue module at 180, method 150 preferably proceeds to method 182 of FIG. 6.

Figure 6:
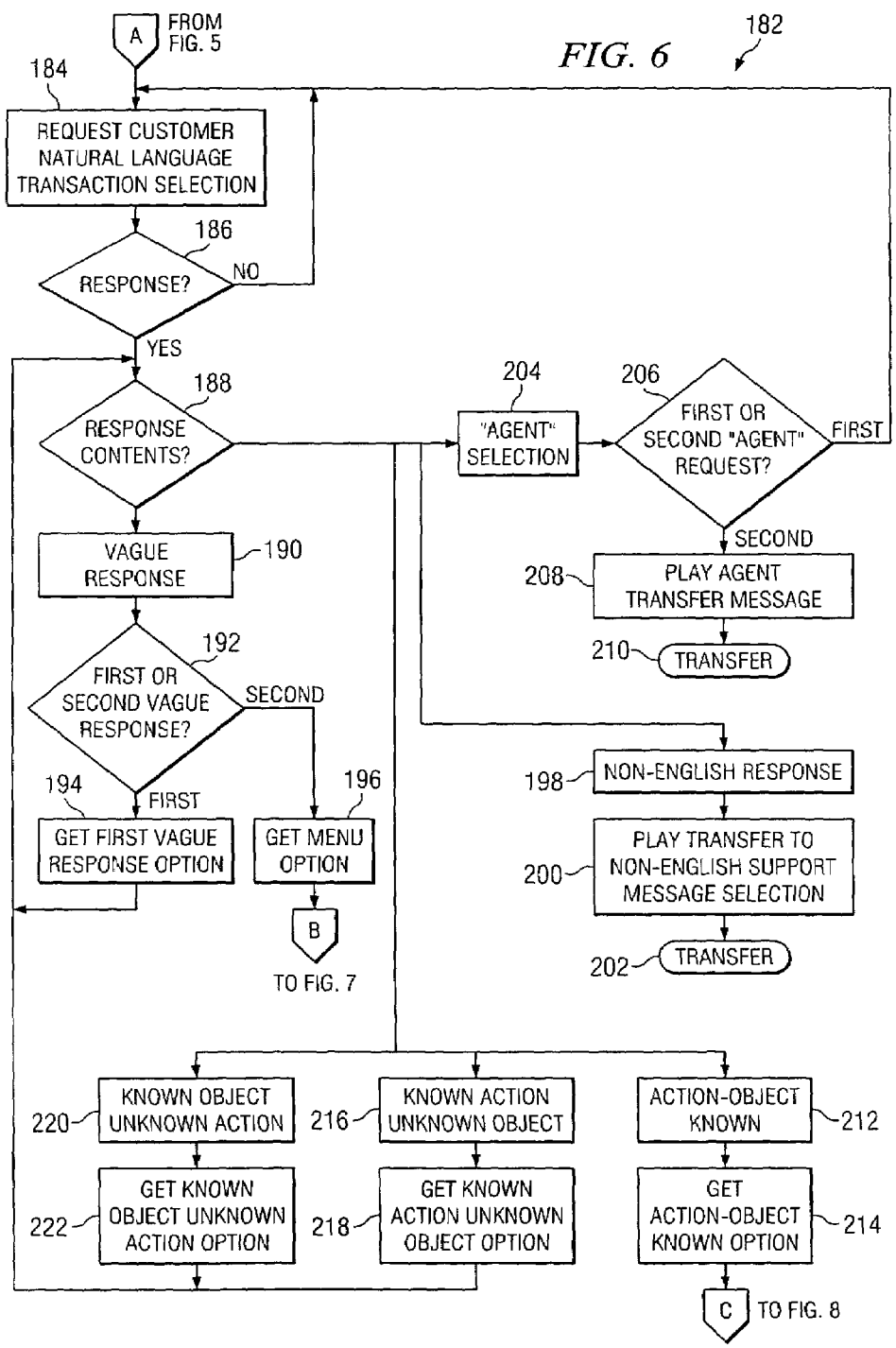
FIG. 6 is a flow diagram depicting one embodiment of a portion of a method for implementing an automated call routing application in a speech enabled call center environment incorporating teachings of the present invention.

Referring now to FIG. 6, a flow diagram depicting one embodiment of a portion of a method for implementing an automated call routing application in a speech enabled call center environment is shown according to teachings of the present invention. As illustrated in FIGS. 5 and 6, method 182, in one embodiment, may be a continuation of method 150 from FIG. 5. In an alternate embodiment, operations preferably performed in association with method 182 may be developed and implemented independent of those operations preferably performed in association with method 150 of FIG. 5.

Following initiation of a speak freely dialogue module at 180 of method 150, method 182, at 184, preferably communicates a request for a natural language user utterance indicating a transaction selection. As mentioned above, the speak freely dialogue module initiated at 180 of method 150 is preferably operable to receive and interpret transaction requests from natural language user utterances.

After prompting a user for a transaction selection via a natural language user utterance at 184, method 182 preferably proceeds to 186 where a response to the natural language utterance transaction request prompt may be awaited. If after a predetermined time a response is not detected, method 182 may return to 184 where an additional request for a natural language user utterance transaction selection may be communicated. If, however, a response is detected to the request for a natural language user transaction selection at 186, method 182 preferably proceeds to 188. At 188, the contents of a natural language user utterance response to the request for a transaction selection are preferably evaluated.

As discussed in greater detail below, the evaluation of response contents preferably performed at 188 may be implemented in a variety of manners. In one embodiment, action-object matrix 120 and speech recognition engine 128 may cooperate to ascertain the transaction selected indicated in natural language user utterance. In an alternate embodiment, DTMF input in association with or in lieu of natural language user utterances may be employed in the indication or identification of user transaction selections.

In one aspect of operations preferably performed at 188, it may be determined that a user response to the natural language transaction selection request preferably communicated at 184 includes a vague response. In response to detection of a vague natural language utterance response 190 at 188, method 182 preferably proceeds to 192 where it may be determined whether the current vague natural language user response is the first such vague response or a repeated vague natural language user response from the current user.

If at 192 it is determined that the current natural language response from the user is the first vague natural language response from the present user, method 182 preferably proceeds to 194. At 194, method 182 preferably provides notification to the user of the system's inability to understand the present user natural language transaction selection utterance. Additional operations performed at 194 may include communicating a second request for a user natural language transaction selection, such as that communicated at 184. Following reprompting of the user for entry of a natural language transaction selection, method 182 preferably returns to 188 where subsequent natural language responses to the reprompting may be evaluated.

Alternatively, if at 192 it is determined that the present user has communicated more than one vague natural language response to a request for a user transaction selection, method 182 preferably proceeds to 196. At 196, an alternate transaction selection option may be initiated. In one embodiment, method 182 at 196 preferably provides for a menu communication option enabling a user to perform transaction selection from a presented transaction menu. One embodiment of a menu driven transaction selection option is discussed below with respect to FIG. 7.

In the evaluation of natural language user utterance response contents, it may be determined that the natural language user utterance response includes contents not in the default or currently employed system language. As such, at 198, in response to a determination that a natural language user response includes non-default language contents, method 182 preferably proceeds to 200 where a transfer message informing the user that they are being transferred to a non-default language or secondary language transaction selection or processing module is preferably communicated to the user prior to a transfer of the user to an alternative script, module or agent at 202.

In another aspect, evaluation of natural language user response contents at 188 may indicate user selection of or a request for service from live technical support or an "Agent" 204. In response to a detected request for an "Agent" 204, method 182 preferably proceeds to 206. At 206, it may be determined whether the current user or customer request for an "Agent" is the first such request or a repeated request. If at 206 it is determined that the current "Agent" request is the first such request, method 182 preferably returns to 184 where the user may again be prompted for a natural language transaction selection. Alternatively, if at 206 it is determined that the current "Agent" request from the user is a repeated "Agent" request, method 182 preferably proceeds to 208 where the user may be informed that the system is transferring the user to live support prior to actual transfer of the user at 210.

As mentioned above, one embodiment of the present invention includes the use of an action-object matrix 120 for identifying transaction selections from natural language user utterances. In general, an action-object matrix 120 employed in the present invention may include a plurality of available call center 102 actions cross referenced to a plurality of available objects. Further, in one embodiment, where an action and an object meet within an action-object matrix 120, a selected service solution, script or automated service agent 106, such as an automated service system and/or live technical support, is preferably indicated by an address or routing destination in a look-up table 122 associated with action-object matrix 120. Greater detail regarding the utilization of an action-object matrix 120 in association with teachings of the present invention is discussed below.

Another possible result of the evaluation preferably performed at 188 concerning a user natural language transaction selection response is the identification of a known action-object combination 212. As such, if at 188 it is determined that a natural language user utterance response to the prompt preferably communicated at 184 includes a known action-object combination 212, method 182 may proceed to 214 where method 182 preferably provides for the initiation of an action-object known option, script or module. Greater detail concerning the process associated with a known action-object combination is discussed below, particularly with respect to FIG. 8.

Indicated at 216 is yet another possible determination from the response evaluation preferably performed at 188. As indicated at 216, the evaluation of a natural language user utterance response preferably performed at 188 may indicate a response including a known action and an unknown object or a partially identifiable transaction selection. For example, a natural language user response to the transaction selection request preferably communicated at 184 may include an action identifiable from an associated action-object matrix 120, however, an identifiable object associated with the identified action may be missing or may not be discernible. In such an event, method 182 preferably proceeds to 218 where a get known action-unknown object script, module or option may be initiated.

In one embodiment, operations performed in association with get known action-unknown object script 218 may include identifying the available objects associated with the identified action from an action-object matrix 120. Once the available objects associated with the known action have been identified and/or obtained, a menu listing the available objects may be communicated to the user for their selection therefrom. Following communication of the available objects associated with the identified action, method 182 may return to 188 where response contents to the menu communication may be evaluated. Selection of an available object from the communicated menu may be facilitated from verbal user responses, DTMF input, as well as by other means.

Similar to operations discussed above with respect to 216, it may be determined at 188 that a natural language user utterance response to the transaction selection request preferably communicated at 184 includes a known object-unknown action combination, also a partially identifiable transaction selection. For example, it may be determined at 188 that a natural language user response to a transaction selection request includes an object identifiable in and available from an associated action-object matrix 120, but fails to include an identifiable action associated with the known object. In the event a known object-unknown action combination 220 is determined in the user response at 188, method 182 preferably proceeds to 222 where a known object-unknown action option, script or module may be initiated.

As described above with respect to 218, one embodiment of the known object-unknown action option module preferably initiated at 222 may include identification of one or more actions available and associated with the known object from action-object matrix 120. Following the identification of one or more actions available and associated with the known object, a menu listing such actions may be communicated to the user for selection therefrom. Following communication of the available actions associated with the known object, method 182 may return to 188 where a user response to the menu prompt may be evaluated for its contents.

Figure 7:
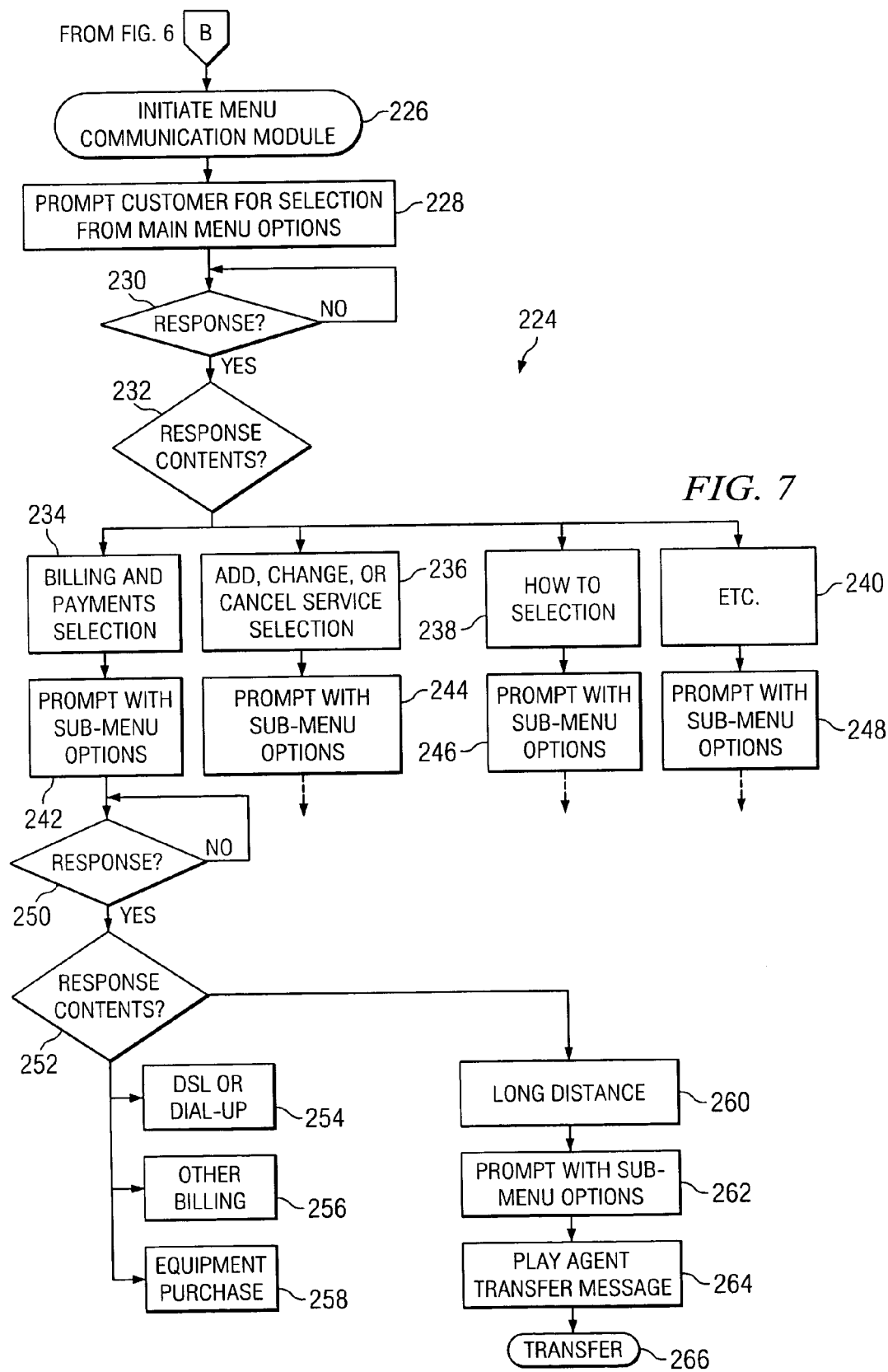
FIG. 7 is a flow diagram depicting one embodiment of a portion of a method for implementing an automated call routing application in a speech enabled call center environment incorporating teachings of the present invention.

Referring now to FIG. 7, a flow diagram depicting a portion of one embodiment of a method for implementing an automated call routing application in a speech enabled call center environment is shown according to teachings of the present invention. In one embodiment, method 224 of FIG. 7 may be implemented as a continuation of method 182 in FIG. 6. In an alternate embodiment, method 224 of FIG. 7 may be implemented separate and distinct from method 182 without departing from the spirit and scope of teachings of the present invention.

As described above with reference to FIG. 6, method 224 of FIG. 7 may be entered for operation in response to repeated vague natural language user transaction selection utterances. In one aspect, operations performed in association with method 224 preferably enable a user, in cooperation with one or more service agents or scripts available from call center 102, to drill down and select from a plurality of available transactions.

As described above, in response to repeated vague natural language user utterances, method 182 of FIG. 6, at 196, may request initiation of a menu communication option module. From 196 of FIG. 6, method 224 of FIG. 7 preferably begins at 226 with the initiation of a transaction menu communication module. Following initiation of a transaction menu communication module at 226, method 224 preferably proceeds to 228 where the user may be prompted for selection of a transaction from a menu or main menu of available options. For example, a main menu of available options may include such options as "Billing and Payments", "Add, Change or Cancel Service", "How to Use" and "Cost Information."

Following communication of a main transaction menu at 228, method 224 preferably proceeds to 230 where a response from the user to the main transaction menu option listing may be awaited. Upon detection of a user response at 230, method 224 preferably proceeds to 232 where contents of a user response may be evaluated. In one aspect, the user may respond to the communication of one or more main menu transaction options verbally, via DTMF input, as well as by other means. The main menu transaction options presented at 228 may also be presented with a pause between each enabling the user or customer to select an option during the pause via one or more option selection means.

In one embodiment, the user response contents evaluated at 232 may include selection of Billing and Payments selection 234, Change or Cancel Service selection 236, How To selection 238, as well as other transaction selections 240. Following identification of a user selection from main menu options 234, 236, 238 and 240 at 232, method 224 may proceed to 242, 244, 246 or 248, respectively.

At 242, 244, 246 or 248, a sub-menu associated with the option selected by the user is preferably communicated. For example, if a user selects Billing and Payment selection 234, method 224 preferably proceeds to 242 where a sub-menu of options associated with Billing and Payment selection 234 may be communicated for user selection. At 250, a user response to the sub-menu communication may be awaited. Upon detection of a user response to the sub-menu communication, method 224 may proceed to 252 where contents of the user response may be evaluated.

In the present example, Billing and Payment selection 234 may have associated with it such sub-menu options as "DSL or Dial-Up" option 254, "Other Billing" option 256, "Equipment Purchase" option 258, and "Long Distance" option 260. Continuing with the present example, if a user responds to a prompt of sub-menu options with selection of Long Distance option 260, method 224 preferably proceeds to 262 where one or more "sub-menu" or "sub-sub-menu" options associated with Long Distance option 260 may be communicated to the user.

The presentation, selection and communication of main menus, sub-menus, sub-sub-menus, etc., may continue in an effort to drill down in the available transactions and permit precise user transaction selection. For example, if at 252 it is determined that the user or customer is calling for Billing and Payment selection 234 associated with DSL or Dial-Up service 254, method 224 may then transfer the user to an appropriate agent available to service one or more transactions associated with DSL or Dial-Up option 254. Accordingly, once a customer or user has made a transaction selection, method 224 preferably proceeds to 264 where an agent transfer message may be communicated to the user prior to transferring the user at 266, e.g., to Billing Agent 136 available from service solution scripts or agents 106.

As suggested above and in FIG. 7, main menu options 236, 238 and 240 may proceed in a manner similar to that described above with reference to Billing and Payments main menu selection 234. Alternate embodiments of presenting a menu based transaction selection system to a user may be implemented without departing from the spirit and scope of the teachings of the present invention.

Figure 8:
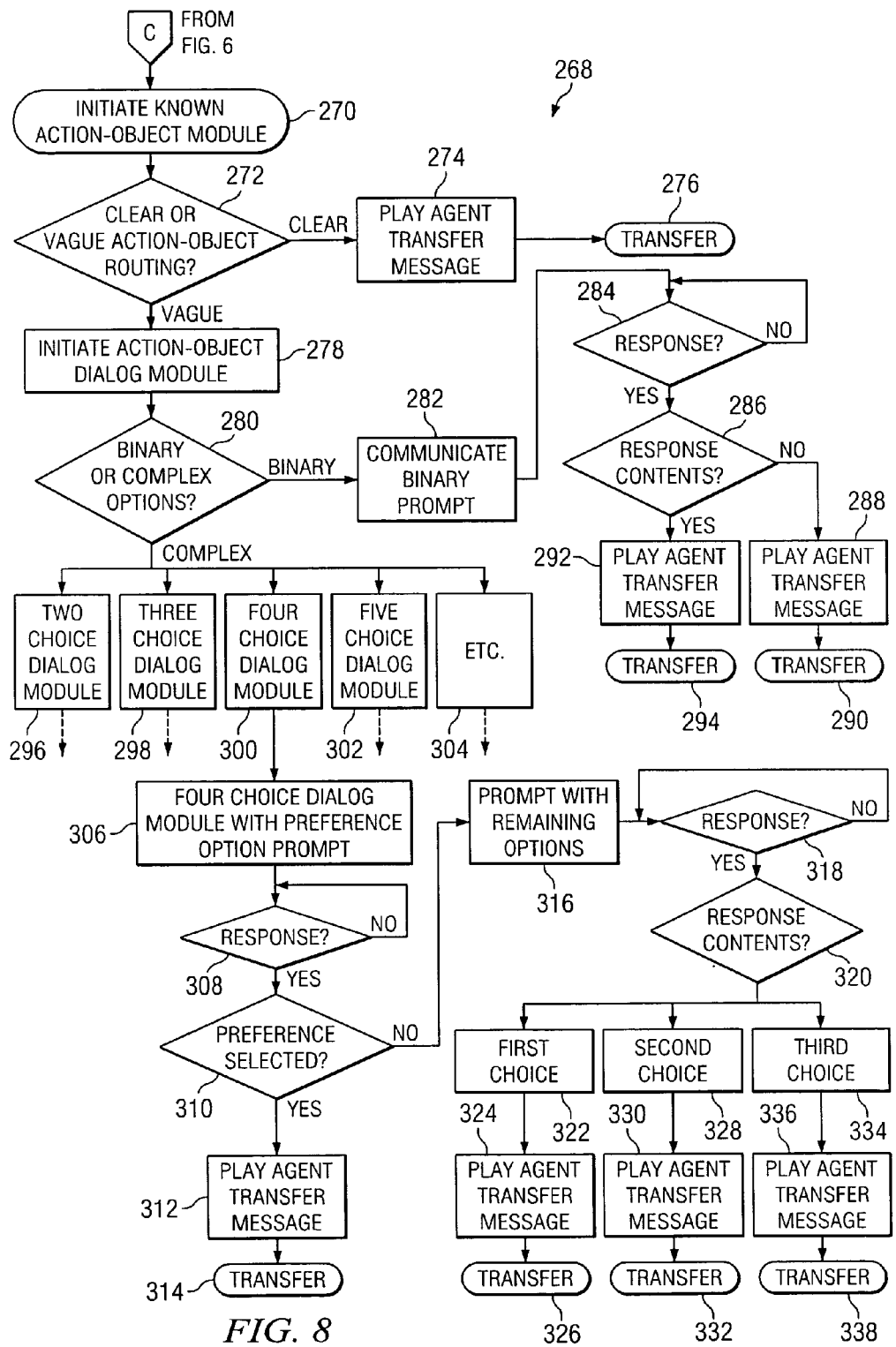
FIG. 8 is a flow diagram depicting one embodiment of a portion of a method for implementing an automated call routing application in a speech enabled call center environment incorporating teachings of the present invention.

Referring now to FIG. 8, a flow diagram depicting a portion of one embodiment of a method for implementing on automated call routing application in a speech enabled call center environment is shown according to teachings of the present invention. Method 268 of FIG. 8 preferably enables processing of a user transaction selection identified from a known action-object combination identified from an associated action-object matrix 120 available from call center 102, for example. Method 268 of FIG. 8 may be implemented and effected separate and apart from method 182 of FIG. 6 without departing from the spirit and scope of the teachings of the present invention.

As discussed above, in one embodiment of the present invention, method 268 of FIG. 8 may be initiated in response to the identification of a known action-object combination 212 in a natural language user utterance response to a request for a transaction selection. Following identification of a known action-object combination 212, method 182 of FIG. 6 preferably proceeds to 214 where a get known action-object script is preferably initiated, then progresses to 270 of method 268 where a known action-object combination script module may be initiated.

Following initiation of a known action-object combination script or module at 270, method 268 preferably proceeds to 272. At 272, a determination may be made as to whether the known action-object combination includes clear or vague routing. Clear routing may be generally defined as a single automated service agent address or routing destination available in look-up table 122 and associated with an action-object combination included in action-object matrix 120. Vague routing may be generally defined as a plurality of applicable automated service agent addresses available in look-up table 122 and associated with an identified action-object combination of action-object matrix 120. Alternative scenarios or definitions of clear and/or vague routing are also contemplated.

If it is determined at 272 that the identified or known action-object combination includes clear routing, method 268 preferably proceeds to 274 where an automated service agent transfer message may be communicated to the user prior to transferring the user at 276 to a designated automated or live technician service agent associated with the known action-object combination. Alternatively, if at 272 it is determined that the known action-object combination has associated with it vague routing, method 268 preferably proceeds to 278.

At 278, a known action-object combination dialogue module may be initiated for purposes of clarifying the vague routing condition. Following initiation of a known action-object combination dialogue script or module at 278, method 268 preferably proceeds to 280 where it may be determined whether the known action-object combination has associated with it binary or more complex routing options. If at 280 it is determined that the known action-object combination includes binary options, method 268 preferably proceeds to 282 where the binary options associated with the known action-object combination may be communicated to the user for selection.

For example, if a user contacts call center 102 concerning billing and payments associated with their long distance telephone service, one set of binary options available and associated with available long distance billing and payment transactions may include such binary options as whether the user's long distance is provided by the operator of call center 102 or another long distance provider. Following communication of the binary prompt associated with the known action-object combination at 282, a user response may be awaited at 284. Upon detection of a user response at 284, method 268 preferably proceeds to 286 where the contents of the user response may be evaluated for a selection from the binary prompt.

As the prompt in the present instance is binary, method 268 preferably proceeds to 288 where an agent transfer message associated with user selection of the first of the binary prompts is preferably communicated to the user prior to transferring the user to a designated service script, agent or module at 290. Similarly, if at 286 it is determined that the user selected the second of the binary options presented at 282, method 268 preferably proceeds to 292 where an agent transfer message may be communicated to the user prior to transferring the user to a designated service agent associated with the second binary option at 294.

In an alternate embodiment, presentation of the binary options available with a known action-object combination may entail presenting the user only with a most frequently selected option. Following communication of a most frequently selected option of the available binary options associated with the known action-object combination, the user may be requested to respond with a verbal "yes" or "no" or to enter one or more DTMF responses to accept transfer to a service agent associated with the most frequently selected binary option. Following the presentation of the most frequently selected option, method 268 may proceed to 284 where a user response may be awaited and, upon detection of a user response, proceed to 286 where the user response may be evaluated.

If at 286 it is determined the user accepted selection of the most frequently selected binary option, method 268 may communicate an associated agent transfer message to the user prior to transferring the user to a designated service agent. However, if at 286 it is determined that the user or customer rejected the most frequently selected option of the available binary options associated with the known action-object combination, method 268 may communicate an agent transfer message associated with the least frequently selected option associated with the known action-object combination prior to transferring the user to a service agent associated with the least frequently selected binary option.

If at 280 it is determined that the identified action-object combination has associated with it complex transaction options, method 268 may proceed to one or more of 296, 298, 300, 302 and/or 304. Depending on the number of options available in a complex transaction option associated with the identified action-object combination, method 280 may proceed to its associated number option choice dialogue module. For exemplary purposes, four-choice dialogue module 300 will be discussed herein. It should be noted that teachings associated with four-choice dialog module 300 may be adapted for other dialogue module variants.

If at 280 it is determined that the identified action-object combination includes four-choice transaction option selection 300, method 268 may proceed to 306. At 306, presentation of the four (4) choices available from four-choice dialogue module 300 and associated with the identified action-object combination may begin. In one embodiment of the prompting preferably performed at 306, a user may be presented with a preferred option selected from the multiple options associated with the identified action-object combination. In one implementation of such an embodiment, the preferred option presented to the user may be the option among the multiple available options that has been most frequently selected.

Following prompting at 306, method 268 may proceed to 308 to await a user response to the presentation of the preferred option. Once a response is detected, method 268 may proceed to 310 where a determination may be made as to whether the user selected the preferred option presented or whether the user desires to make a selection from the remaining options associated with the identified action-object combination.

If at 310 it is determined the user selected the preferred option of the four (4) options available from four-choice dialogue module 300, method 268 preferably proceeds to 312 where an agent transfer message may be communicated or presented to the user prior to transferring the user or customer to a service agent associated with servicing the preferred option. Alternatively, if at 310 it is determined that the user does not select the preferred option presented at 306, method 268 preferably proceeds to 316 where the user may be presented with the remaining options available from a multiple option dialogue module. In the present example, prompting with remaining options at 316 may include prompting the user with the remaining three (3) options available from four-choice dialogue module 300. Following prompting of the user or customer with the remaining options at 316, method 268 may proceed to 318 where a user selection or response may be awaited.

In response to detection of a user response at 318, method 268 preferably proceeds to 320. At 320, the user response may be evaluated to determine which option presented at 316 the user selected. Depending on the option selected, the user is preferably presented with an agent transfer message associated with the call center service agent enabled to facilitate processing of the user selected transaction prior to transferring the user to such service agent.

As illustrated in FIG. 8, of the three (3) remaining options preferably presented to a user at 316, the contents of a user response preferably evaluated at 320 may indicate user selection of first choice 322. Following a determination of user selection of first choice 322, the user is preferably presented with an agent transfer message at 324 prior to transfer of the user to a designated service agent at 326. Similarly, if a user indicates selection of second choice 328, a transfer message may be communicated at 330 prior to actual transfer of the user or customer at 332. Finally, if the user were to select third choice 334 from the options at 316, method 268 preferably proceeds to 336 where an agent transfer message associated with third choice 334 communicated prior to transferring the user to designated service agent at 338.

Although the disclosed embodiments have been described in detail, it should be understood that various changes, substitutions and alterations can be made to the embodiments without departing from their spirit and scope.

What is claimed is:

1. A method for implementing an automated call routing application in a speech enabled call center environment, comprising:
   maintaining a communication connection with a user;
   comparing one or more characteristics of the user communication connection with a set of call center conditions;
   communicating a condition message to the user in response to a match between a characteristic of the user communication connection and at least one of the set of call center conditions;
   initiating a speak freely dialog module operable to receive and interpret natural language utterances from the user;
   eliciting a natural language utterance from the user indicating user selection of an available call center transaction;
   evaluating the natural language user utterance to identify its contents;
   if the natural language user utterance includes a second indication of an agent request, presenting to the user a transfer to agent message and transferring the user communication connection to a selected agent;
   if the natural language user utterance includes a first vague call center transaction selection, prompting for an additional natural language user utterance indicating selection of a call center transaction;
   if the natural language user utterance includes a second vague call center transaction selection, presenting a menu of options to the user to which the user may respond with a natural language utterance selection of a transaction from the menu of options;
   if the natural language user utterance includes a known action unknown object combination, initiating a dialog module operable to elicit from the user identification of an object associated with the known action;
   if the natural language user utterance includes a known object unknown action combination, initiating a dialog module operable to elicit from the user identification of an action associated with the known object; and
   upon identification of a known action-object combination, accessing a look-up table including routing destinations for service agents operable to service selected action-object combinations and routing the user to a destination associated with the known action-object combination.

2. A system for delivering an automated call routing application in a call center environment, comprising:
   at least one processor;
   memory operably associated with the processor; and
   a program of instructions storable in the memory and executable by the processor, the program of instructions operable to
   prompt a user for entry of a natural language transaction selection,
   in response to receipt of a natural language response, evaluate the response to determine whether the response includes an unidentifiable transaction selection, a partially identifiable transaction selection or an identifiable transaction selection,
   determine whether an identifiable transaction selection includes an agent service request,
   if the identifiable transaction selection is a request for agent services, determine whether the request for agent services is a first request or a repeated request,
   if the request for agent services is the first request, prompting the user for entry of a natural language transaction selection,
   if the request for agent services is the repeated request, facilitate routing of the user to a service provider,
   if the identifiable transaction selection is not a request for agent services, determine whether the identifiable transaction selection has an associated clear routing option,
   if the identifiable transaction selection has a clear routing option, facilitate routing of the user in accordance with the clear routing option otherwise present to the user a plurality of selectable options associated with the identifiable transaction selection,
   if the user response is a partially identifiable transaction selection, initiate dialog with the user to elicit an identifiable transaction selection,
   if the user response is an unidentifiable transaction selection, determine whether the user provided the previous unidentifiable transaction selection response, and
   if the user provided the previous unidentifiable transaction selection response, present a menu of options selectable by the user otherwise prompt the user for entry of a natural language transaction selection.

3. The system of claim 2, further comprising the program of instructions operable to communicate a transfer message to the user prior to facilitating user transfer.

4. The system of claim 2, further comprising the program of instructions operable to facilitate routing of a user to live support in response to multiple user requests for agent services.

5. The system of claim 2, further comprising the program of instructions operable to provide a touch-tone enabled menu system in response to user provision of multiple unidentifiable transaction selections.

6. The system of claim 2, further comprising the program of instructions operable to facilitate routing of the user in accordance with user selection of an option from the plurality of options associated with the identifiable transaction selection.

7. The system of claim 2, further comprising the program of instructions operable to provide a binary selection presentation when an identifiable transaction selection includes only two options.

8. The system of claim 2, further comprising the program of instructions operable to:

present a preferred option available from a plurality of options associated with an identifiable transaction selection for immediate selection; and present the remaining options in the plurality of options if the preferred option is not selected.

9. The system of claim 2, further comprising the program of instructions operable to compare the response to an action-object matrix to determine whether the response includes an unidentifiable, partially identifiable or identifiable transaction selection.

10. The system of claim 2, further comprising the program of instructions operable to identify the user and route the user to a service provider if the user meets one or more selected criteria.

11. The system of claim 10, further comprising the program of instructions operable to identify the user from one or more characteristics of the user communication connection.

12. The system of claim 2, further comprising the program of instructions operable to search the response for key words to determine whether the response includes an unidentifiable, partially identifiable or identifiable transaction selection.

* * * * *

UNITED STATES PATENT AND TRADEMARK OFFICE
CERTIFICATE OF CORRECTION

PATENT NO. : 7,623,632 B2
APPLICATION NO. : 10/926813
DATED : November 24, 2009
INVENTOR(S) : Bushey et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1490 days.

Signed and Sealed this

Twenty-sixth Day of October, 2010

David J. Kappos
*Director of the United States Patent and Trademark Office*